United States Patent [19]

Ghidella et al.

[11] 4,355,841
[45] Oct. 26, 1982

[54] MOTOR VEHICLE BODY

[75] Inventors: Vittorio Ghidella; Felice Cornacchia, both of Turin, Italy

[73] Assignee: Fiat Auto S.p.A., Turin, Italy

[21] Appl. No.: 108,627

[22] Filed: Dec. 31, 1979

[30] Foreign Application Priority Data

Feb. 2, 1979 [IT] Italy .............................. 67230 A/79

[51] Int. Cl.³ ............................................ B62D 27/00
[52] U.S. Cl. .................................. 296/185; 296/31 P; 296/194
[58] Field of Search ...................... 296/31 P, 185, 191, 296/194

[56] References Cited

U.S. PATENT DOCUMENTS

| 3,709,770 | 1/1973 | Hale | 296/31 P |
| 3,875,661 | 4/1975 | Lidstrom | 296/31 P |
| 4,153,290 | 5/1979 | Barenyi | 296/31 P |

OTHER PUBLICATIONS

J. C. Whitney & Company Catalog, Copyright 1978, p. 113.

*Primary Examiner*—Joseph F. Peters, Jr.
*Assistant Examiner*—John A. Carroll
*Attorney, Agent, or Firm*—Sughrue, Mion, Zinn, Macpeak & Seas

[57] ABSTRACT

A motor vehicle is provided with a body having a supporting structure of sheet metal and external lateral walls which below a substantially horizontal line extending above the vehicle wheels, comprises exclusively parts of plastics material. As compared with sheet metal parts, the plastics-material parts present a number of advantages including simpler assembly, better corrosion resistance and reduced susceptibility to damage in a minor collision.

2 Claims, 6 Drawing Figures

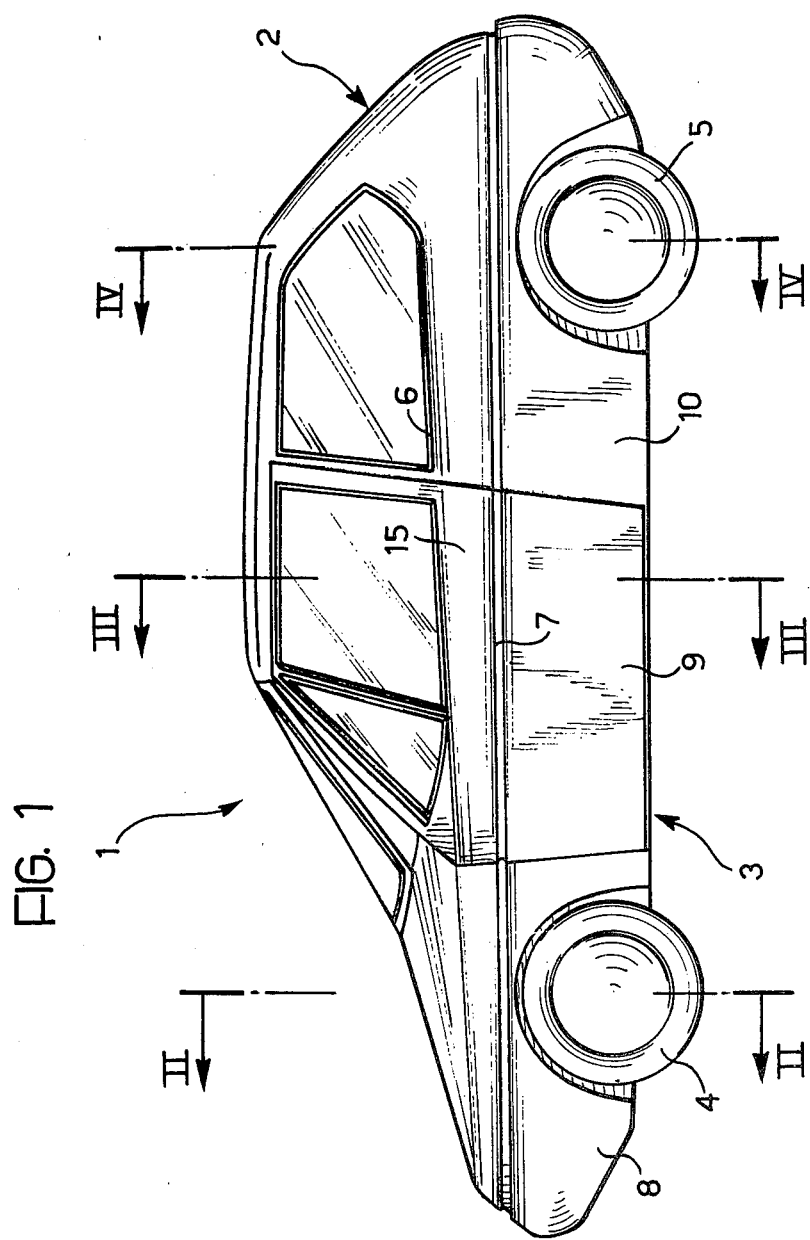

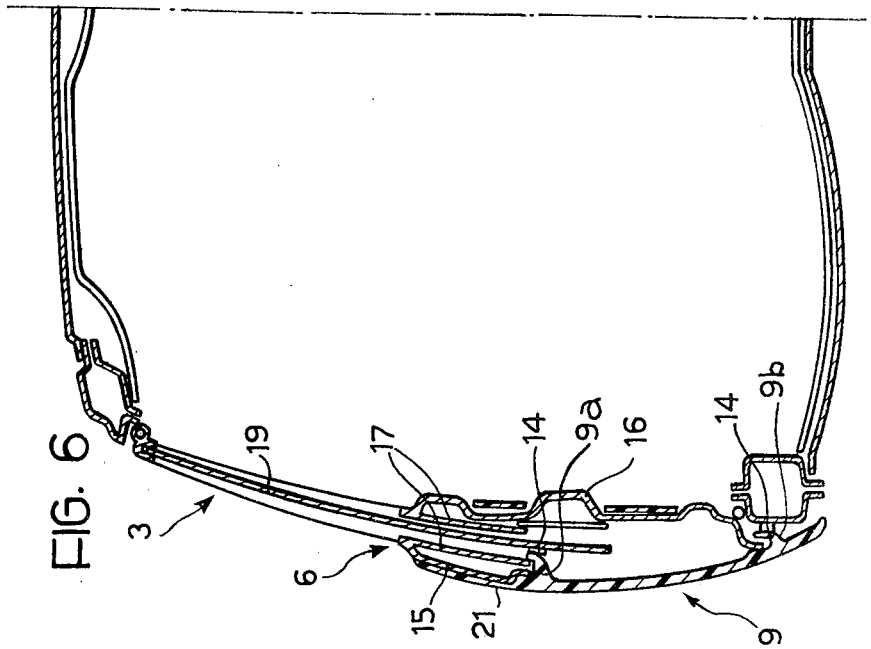
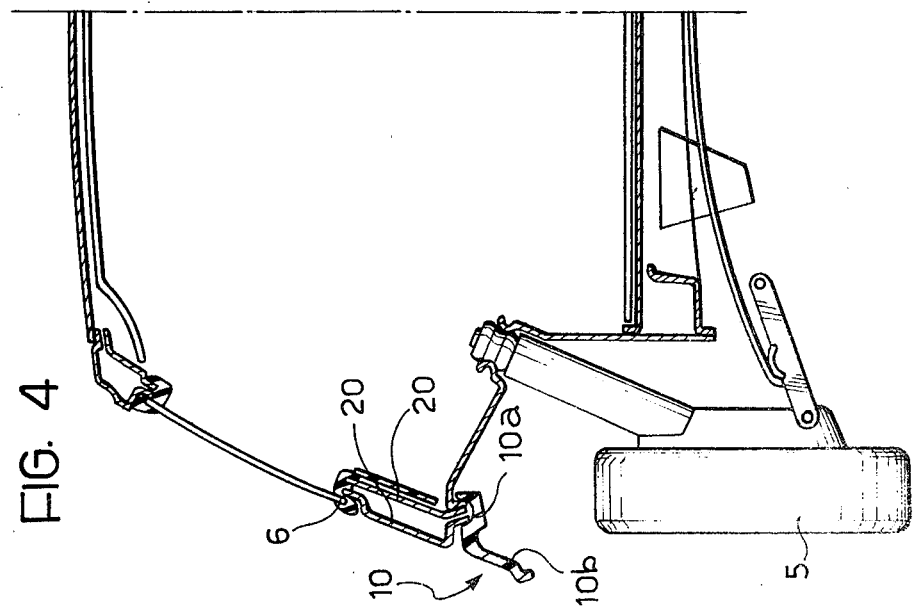

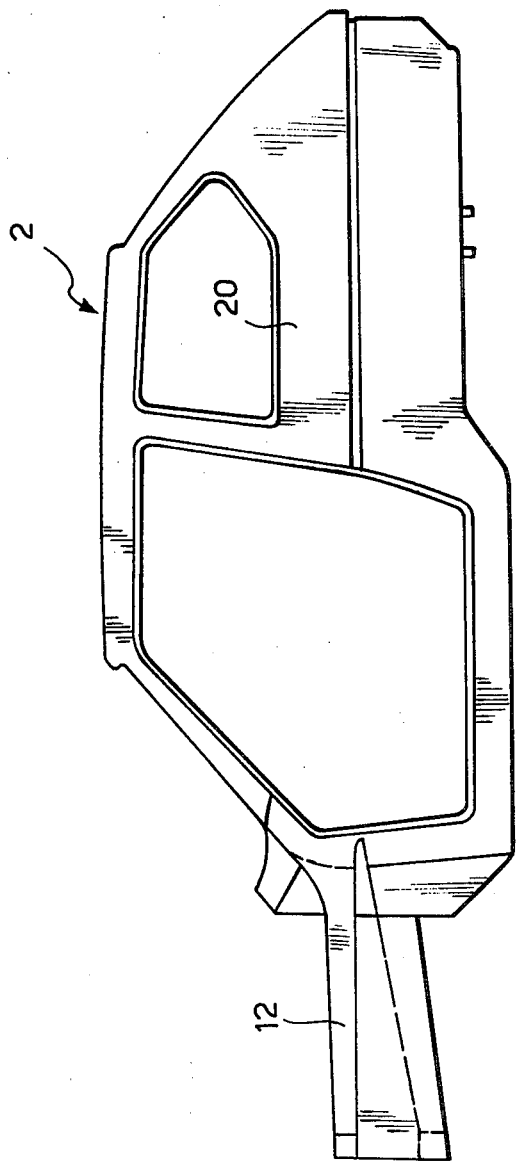

MOTOR VEHICLE BODY

The present invention relates to motor-vehicle bodies of the type built around a supporting structure of sheet metal.

Vehicles are already known which have front and rear parts made of plastics material substituted for analogous parts in sheet metal.

The object of the present invention is to extend the use of plastics material to other parts of the vehicle bodywork.

According to the present invention, there is provided a body having a supporting structure of sheet metal wherein each of the two external lateral surfaces of the body is defined by a wall which below a substantially horizontal line extending above the wheels of the vehicle, comprises exclusively parts of plastics material.

The use of parts made of plastics material for the vehicle body makes it possible to achieve a number of advantages both in the manufacture and in the running of the motor vehicle.

Thus, for example, since parts of plastics material generally do not require painting after their manufacture, these parts can be attached to the metal part of the body after the latter has been painted. This facilitates and simplifies the painting operation, and also facilitates the assembly of the mechanical parts of the vehicle onto the body structure.

Furthermore, by using plastics material it is possible to obtain body parts which have appreciably greater elasticity than their sheet metal equivalents and thus do not undergo permanent deformation after minor collisions.

Furthermore, the parts made of plastics material can be designed to protect the metal parts of the vehicle body from rust and corrosion, these being phenomena which are particularly prevalent in the lower region of the body, especially around the wheels of the vehicle.

For motor vehicles intended for use in areas where the risk of corrosion is high, (such as in North America and northern Europe), the motor vehicle can be provided with supplementary internal wings of plastics material in order to protect the internal metal parts of the body adjacent the wheels from corrosion; in such cases the internal wings may be made in a single piece integral with the parts of plastic material which form the external lateral walls of the vehicle body.

A further advantage of the use of plastics-material parts for the vehicle side walls is that since plastics-material parts are generally uniformly coloured throughout their volume, the aesthetic problems caused by scratching of their external surfaces are considerably less than would be the case with bodies of the known type made of metal parts, insofar as the surfaces exposed by these scratches are substantially identical in colour to the external surface of these parts.

A motor vehicle embodying the invention will now be particularly described, by of example, with reference to the accompanying diagrammatic drawings, in which:

FIG. 1 is a side elevation of the motor vehicle;

FIG. 4 shows part of a section taken on line IV—IV of FIG. 1;

FIG. 5 is a side elevation of the metal portion of the vehicle body; and

FIG. 6 is a section similar to FIG. 3 but showing a modified form of vehicle body.

Figure 3:
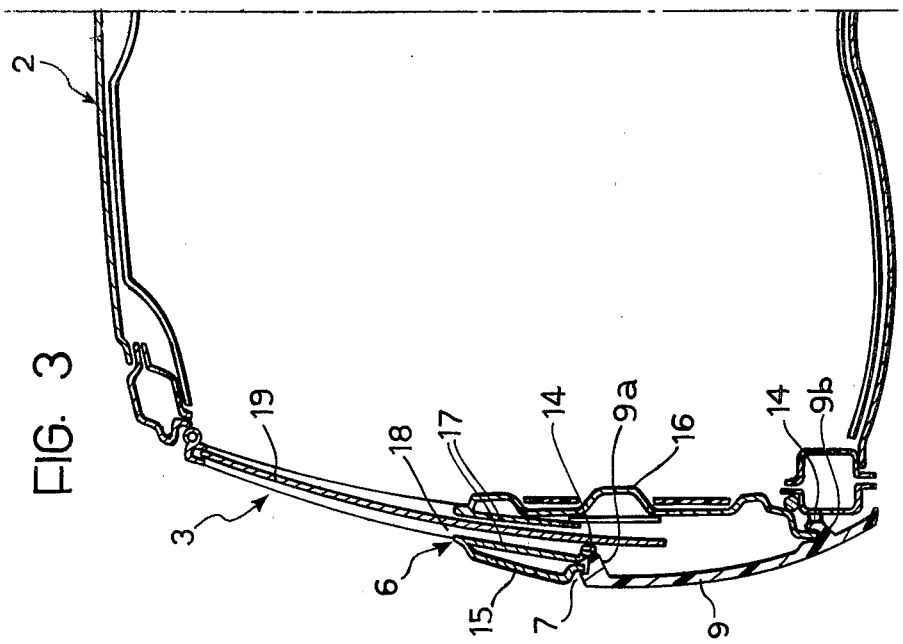
FIG. 3 shows part of a section taken on line III—III of FIG. 1.

The motor-vehicle 1 shown in FIG. 1 is of the "two box" type (as engine compartment 'box' and a passenger compartment-luggage space 'box') and comprises a body 2 built around a load-bearing or supporting structure of sheet metal, and front and rear wheels 4 and 5 respectively. The body 2 is provided with two side doors 3 for access to the seats of the vehicle.

Each of the two side surfaces of the body 2 has a longitudinally-extending zone or "belt" delimited by an upper "belt" line 6 passing along the lower edges of the windows of the vehicle and by a lower, horizontal line 7 extending above the wheels 4, 5 below the line 6.

The exterior wall which defines each side of the body 2 comprises, below the line 7, exclusively parts of plastics material.

In the example shown, the portion of each side of the vehicle which is arranged below the line 7 comprises three parts of plastics material 8, 9, 10 but it is clear that the number of these parts could be greater.

The plastics-material parts 8, 9 and 10 define respectively the portion of the vehicle side comprised between the front end of the vehicle and the front edge of the door 3, the portion of the vehicle side forming part of the door 3, and the portion of the vehicle side comprised between the rear edge of the door 3 and the rear end of the vehicle.

Figure 2:
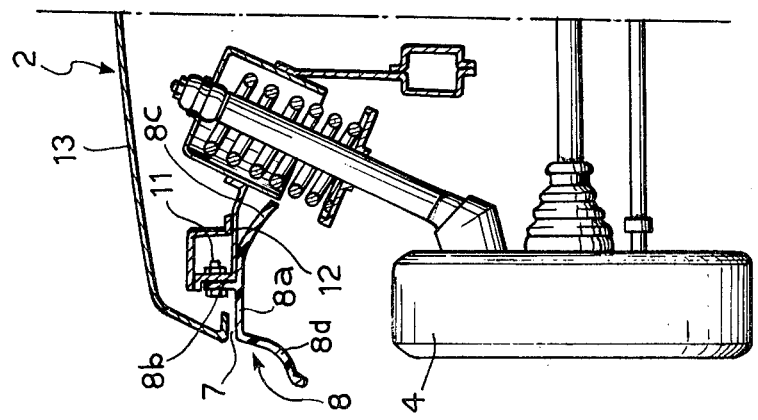
FIG. 2 shows part of a section taken on line II—II of FIG. 1.

FIG. 2 is a transverse section through the part 8 taken in a vertical plane containing the axes of the front wheels 4 of the vehicle. As can be seen in FIG. 2, the part 8 arches over the wheels 4 like a roof and comprises a straight horizontal central portion 8a from the upper surface of which projects a vertical flange 8b. This flange 8b is secured by bolts 11, one of which is shown in FIG. 2, to a sheet metal part 12 of the vehicle body 2.

At its end nearest the interior of the body 2, the central portion 8a of the part 8 joins with a downwardly-inclined, straight portion 8c while the outer end of the central portion 8a joins with a curved portion 8d, whose concave surface faces upwards and outwards. The external profile of the body 2 is defined above the line 7 by a sheet metal part 13; below the line 7, the external profile is defined by the curved portion 8d of the plastics-material part 8. It can be seen that the part 8, besides defining the front lower portion of the vehicle side, also constitutes, in the region of the front wheel 4, a supplementary wing designed to protect the adjacent internal metal parts of the body 2 from corrosion.

It is also evident that, since the part 8 may be secured to the body 2 after the metal structure of the said body has been painted, this painting operation is considerably facilitated. Attachment of the mechanical parts of the vehicle to the body 2 is also simplified.

A further advantage lies in the fact that the curved portion 8d of the plastics-material part 8 protrudes externally with respect to the metal part 13, as a result of which the latter part is less likely to be damaged in a minor collision which causes only elastic deformation of the curved portion 8d.

The plastics-material part 9 which defines the external surface of the lower portion of each door 3, comprises a panel provided adjacent its upper and lower edges with upwardly-directed lateral projections 9a and 9b respectively. These projections 9a, 9b facilitate the secural of the panel 9 to the metal structure of the body 2 by means of screws 14. The projection 9a is secured to the lower edge portion of a metal panel 15 which forms the so-called "belt" of the side wall of the body, whilst the projection 9b is secured to the lower edge portion of an internal metal panel 16. The metal panel 16 is integral with the panel 15 at the front and rear edges of the door 3. Between the metal panels 15 and 16, are arranged two panels 17 in side by side relation. The two panels 17 are respectively secured to the metal panels 15 and 16. The panel 17 which is nearer the outside of the vehicle has its lower edge portion secured to the projection 9a jointly with the lower edge portion of the metal panel 15.

The upper edges of the metal panels 15, 16 define an aperture 18 for the passage of a window 19 of the vehicle door 3.

The described structure of the door 3, greatly simplifies and facilitates the painting of the internal metal parts of the door 3. A further advantage of the described door structure is that it enables the devices for the control of the window 19, the lock and the handle of the door to be assembled onto the plastics-material panel 9 prior to the fixing of this panel onto the metal structure of the door; as a result the assembly of the vehicle doors is thus considerably simplified.

It is also possible to modify the external profile of the body simply by varying the form of the plastics-material panel 9. The metal parts supporting the panel 9 can thus be designed to perform their strenghtening and stiffening functions without regard to aesthetic considerations.

Shown in FIG. 4, is a transverse section of the plastics-material part 10 taken in a vertical plane containing the axes of the vehicle rear wheels 5. As can be seen from FIG. 4, the part 10 has a U-shaped portion 10a, secured within which are the edges of three metal parts of the body 2. The portion 10a is connected on its side towards the exterior of the body 2 to a straight portion 10b which is downwardly inclined away from the portion 10a. The portion 10b protrudes externally with respect to the metal parts 20.

This structure of the rear side wall of the vehicle gives rise to the advantages mentioned above for the front side wall portion of the vehicle. In particular, those portions of the metal parts 20 which are situated above the rear wheels 5 are protected from corrosion, whilst the portion 10b of the part 10 serves to protect the metal parts 20 from damage in a minor collision.

FIG. 5 shows the metal portion of the vehicle body 2 prior to the addition of the mechanical parts of the vehicle and of the body parts of plastics material.

In a modified form of the vehicle body, the upper edges of the plastics-material parts 8, 9, 10 are extended above the line 7 to cover the metal portion of the vehicle side wall comprised between the lines 6 and 7. This modification is illustrated in FIG. 6 which is a transverse section of the body passing through the door 3 of the vehicle. As can be seen from FIG. 6, the plastics-material panel 9 is continued upwards above the line 7 by an extension 21 which extends up to the line 6 of the vehicle side wall and covers the external surface of the metal panel 15.

In this modified form of vehicle body 1 no major surfaces of the metal structure of the vehicle body are laterally externally visible, the only portions of this structure that can be seen being the outline posts of the window frames. As a result, it is possible, in mass production, to paint the metal structures economically by immersion in a single colour and to obtain a range of colours for the vehicles under production simply by changing the colours of the parts made from plastics-material.

I claim:

1. A motor vehicle having front and rear wheels and a body including side walls each having windows and at least one door, the lower edges of said windows defining a substantially horizontal belt line, each of said side walls below said belt line being comprised of an internal sheet metal wall and an external wall spaced from each other, said body having horizontal line defining means extending about said body on the external surface thereof immediately above said wheels and spaced below said belt line, the external wall of each side wall between said belt line and said line defining means being comprised of sheet metal and the external wall of each side wall below said line defining means being constructed solely from plastic material parts, wherein considered in a vertical plane containing the axes of the vehicle front wheels, each said first plastic material part has a cross-sectional profile which arches like a roof over the corresponding front wheel and comprises a horizontal central portion, a vertical flange extending upwards from said central portion and serving to facilitate the secural of said first plastic material part to said metal structure of said body, a downwardly-inclined, straight portion connected to the end of said central portion nearest the interior of said body, and a downwardly-inclined, curved portion connected to the end of said central portion nearest the exterior of said body, the concave face of said curved portion facing upwards and outwards and said curved portion constituting a part of the external lateral wall of the vehicle body.

2. A motor vehicle having front and rear wheels and a body including side walls each having windows and at least one door, the lower edges of said windows defining a substantially horizontal belt line, each of said side walls below said belt line being comprised of an internal sheet metal wall and an external wall spaced from each other, said body having horizontal line defining means extending about said body on the external surface thereof immediately above said wheels and spaced below said belt line, the external wall of each side wall between said belt line and said line defining means being comprised of sheet metal and the external wall of each side wall below said line defining means being constructed solely from plastic material parts, wherein each lateral wall of said body includes a door and wherein the portion of said lateral wall comprised between the rear end of the vehicle and said door is defined, below the said horizontal line, by a said plastic material part which considered in a vertical plane containing the axes of the rear wheels of the vehicle, has a cross-sectional profile comprising a U-shaped portion serving for the secural of the said plastic material part to the said metal structure of the body, and a straight portion connected to the end of said U-shaped portion nearest the exterior of said body and inclined downwards therefrom, said straight portion constituting a part of the external lateral wall of the vehicle body.

* * * * *